(12) United States Patent
Drako

(10) Patent No.: US 10,127,440 B1
(45) Date of Patent: Nov. 13, 2018

(54) INSECT INDICIA-BASED ALERT SUPPRESSION APPARATUS, SYSTEM, AND METHOD OF OPERATION

(71) Applicant: Dean Drako, Austin, TX (US)

(72) Inventor: Dean Drako, Austin, TX (US)

(73) Assignee: Eagle Eye Networks, Austin, TX (US)

( * ) Notice: Subject to any disclaimer, the term of this patent is extended or adjusted under 35 U.S.C. 154(b) by 0 days.

(21) Appl. No.: 15/815,548

(22) Filed: Nov. 16, 2017

(51) Int. Cl.
*G06K 9/00* (2006.01)
*G08B 13/196* (2006.01)
*H04N 5/355* (2011.01)

(52) U.S. Cl.
CPC ..... *G06K 9/00362* (2013.01); *G06K 9/00536* (2013.01); *G08B 13/19663* (2013.01); *H04N 5/35563* (2013.01)

(58) Field of Classification Search
CPC .. G06T 7/00; G06T 7/20; G06T 7/215; G06T 7/246; G06T 7/285; G06K 9/00362; G06K 9/00536; G06K 9/4671; G06K 9/468; H01L 27/146; H01L 27/14603; H01L 27/14605; H01L 27/14607; H01L 27/14609; H01L 27/1463; H04N 5/365; H04N 5/35545; H04N 5/35554
See application file for complete search history.

(56) References Cited

U.S. PATENT DOCUMENTS

| | | | | |
|---|---|---|---|---|
| 6,176,429 | B1 * | 1/2001 | Reddersen | G06K 7/10722 235/462.25 |
| 9,317,753 | B2 * | 4/2016 | Saptharishi | G06K 9/00771 |
| 2009/0245573 | A1 * | 10/2009 | Saptharishi | G06K 9/00771 382/103 |

* cited by examiner

*Primary Examiner* — Van Trieu
(74) *Attorney, Agent, or Firm* — Patentry; Peter G. H. Hwang

(57) ABSTRACT

An infrared spectrum video surveillance camera detects insect swarms in order to suppress false alarms and motion alerts. Messages to a security console are filtered when groups of pixels have high saturation, irregular movement, and low measures of edges.

1 Claim, 4 Drawing Sheets

INSECT INDICIA-BASED ALERT SUPPRESSION APPARATUS, SYSTEM, AND METHOD OF OPERATION

CROSS-REFERENCES TO RELATED APPLICATIONS

None.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The present invention relates to video surveillance cameras, security systems and methods of operation.

Description of the Related Art

Video surveillance systems operate at night using infrared cameras. Motion can be detected based on frequency analysis of the components of pixel blocks as well as the comparison of sequential video frames.

In a video surveillance security system, a camera coupled to a processor captures a stream of video frames. Conventional frequency-based filtering determines rapid motion within blocks of pixels and triggers an alert. However, insects are attracted to infrared lights around cameras and cause false alarms.

What is needed is a method to filter out alerts from reaching a security operator console.

What is needed is a method of operation for a video surveillance system that prevents false alarms and unnecessary alerts due to insect motion.

SUMMARY OF THE INVENTION

A method for suppressing motion alerts by filtering on saturation, an absence of edges, and rapidity of changing saturation state in pixel blocks.

The method identifies images that correspond to insects reflecting infrared spectrum light in close proximity to a surveillance video camera. Motion alerts to an operator console are suppressed.

BRIEF DESCRIPTION OF THE SEVERAL VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

Figure 1:
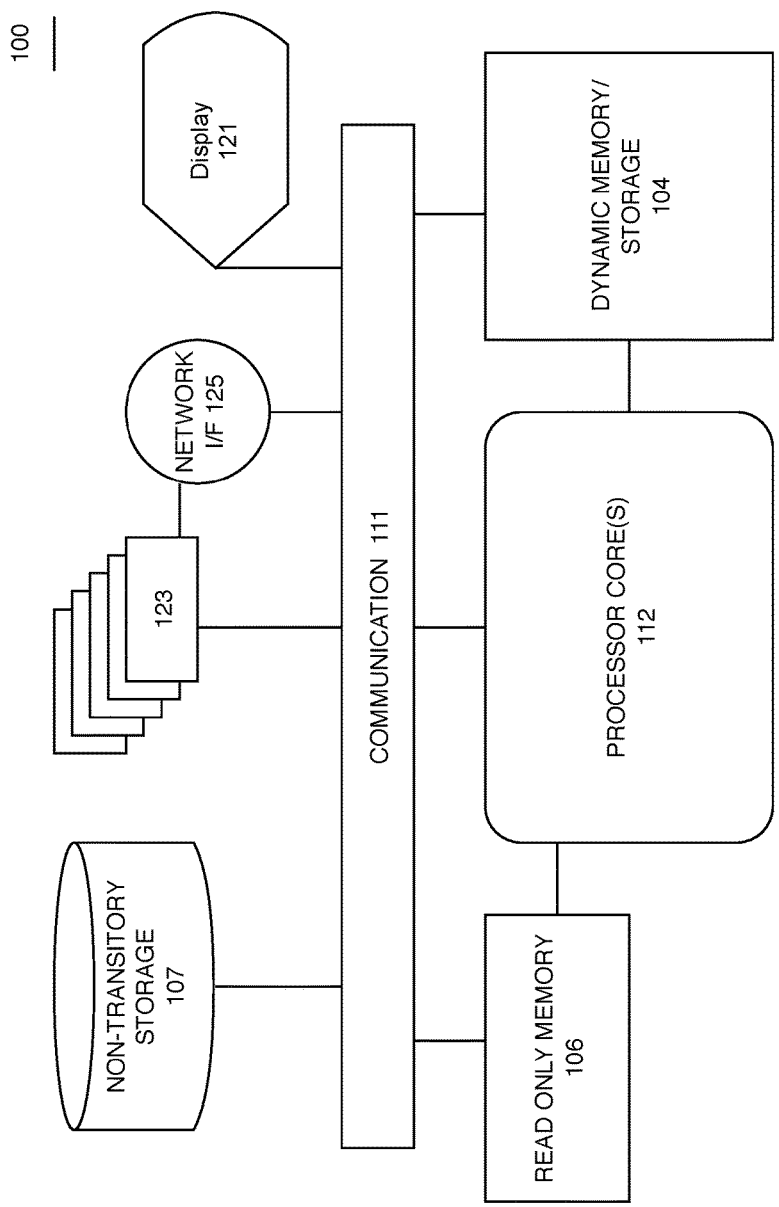
FIG. 1 is a block diagram of a circuit or processor apparatus for performing method steps encoded on tangible non-transitory computer readable media.

A video surveillance camera provides images to a security console. A conventional image transformation circuit triggers on motion and transmits an alert.

As is known, many insects are attracted by infrared light and frequently swarm in the vicinity of cameras with built-in illumination.

Due to the nearness of the insects to the camera with built-in illumination, the intensity of the reflected light is very high and can saturate a cluster of pixels. One aspect of the invention is to identify clusters of saturated pixels which move irregularly, that is without apparent angular momentum.

As is known, in optics, a circle of confusion is an optical spot caused by a cone of light rays from a lens not coming to a perfect focus when imaging a point source. It is also known as disk of confusion, circle of indistinctness, blur circle, or blur spot.

As is known, definitions for hyperfocal distance includes Definition 1: The hyperfocal distance is the closest distance at which a lens can be focused while keeping objects at infinity acceptably sharp. When the lens is focused at this distance, all objects at distances from half of the hyperfocal distance out to infinity will be acceptably sharp. Definition 2: The hyperfocal distance is the distance beyond which all objects are acceptably sharp, for a lens focused at infinity.

For digital images, a gradient of monotonic grey-scale values will surround a cluster of pixels which correspond to a blur spot when a reflection is coming from a distance substantially closer than the hyperfocal distance of a lens.

A conventional image compression technology transforms blocks of pixels to frequency coefficients. Filtering for certain high frequency coefficients is a way of determining edges in a video frame. The absence of high frequency coefficients suggest changes from one frame to another correspond to insect movements closer to the lens than the hyperfocal distance.

As is known, physical objects with non-trivial mass conserve momentum and their movements can be predicted by extrapolation from recent translation across a field of view. Movement by blurs between frames can be tracked for non-linear movement and suggest reflections from insects impinging the lights.

A method of transforming a sequence of video images to suppress motion alerts comprises at least one of the following transformations:

Transforming a sequence of video frames into vectors for movement of a cluster of saturated pixels; and determining the vectors have no substantially net direction.

Transforming a plurality of pixel blocks to frequency coefficients; and determining an absence of substantial coefficients associated with edges.

Transforming a video frame into clusters of saturated pixels; and determining a "halo" of monotonic grey-scale gradient of intensity.

Transforming a plurality of video frames into measurement of the rapidity of switching pixel into and out of saturation.

Filtering conventional motion alerts to the security console upon passing a threshold of selected determinations.

Figure 2:
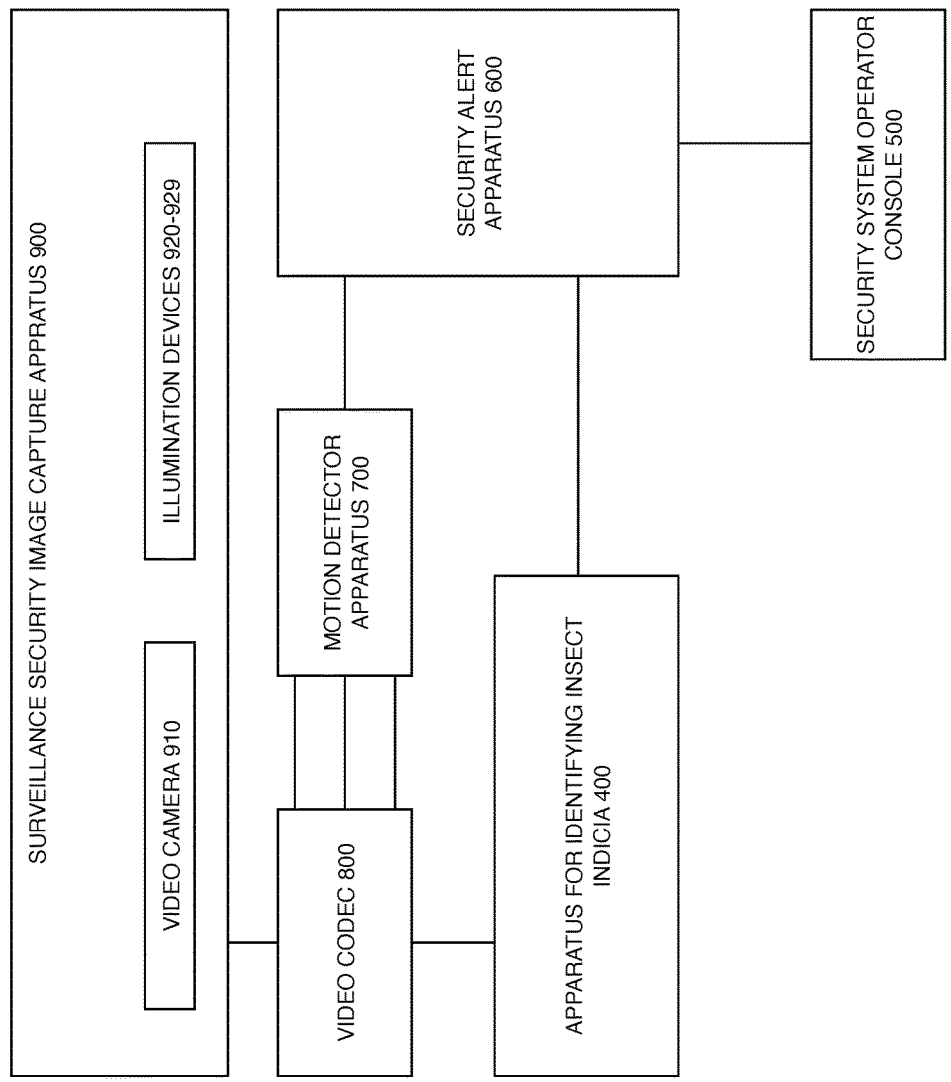
FIG. 2 is a system block diagram of a security system embodiment of the invention.

Referring now to FIG. 2, a system block diagram 200 of a security system embodiment of the invention, includes surveillance security image capture apparatus 900 (IR camera) which has in embodiments a video camera 910, and at least one of illumination devices 920-929 such as an infrared spectrum emitting light; the IR camera is coupled to video codec 800; the video codec is coupled to a motion detector apparatus 700 which operates on data streams such as pixel bit maps, frequency bin coefficients, and motion vectors; the motion detector apparatus is coupled to a security alert apparatus 600; and the security alert apparatus is coupled to a security system operator console 500. The system is distinguished from conventional systems by the insect indicia methods 300 disclosed in FIG. 3 which is performed by an apparatus for identifying insect indicia 400 disclosed in FIG. 4 further coupled to the security alert apparatus 600.

Figure 3:
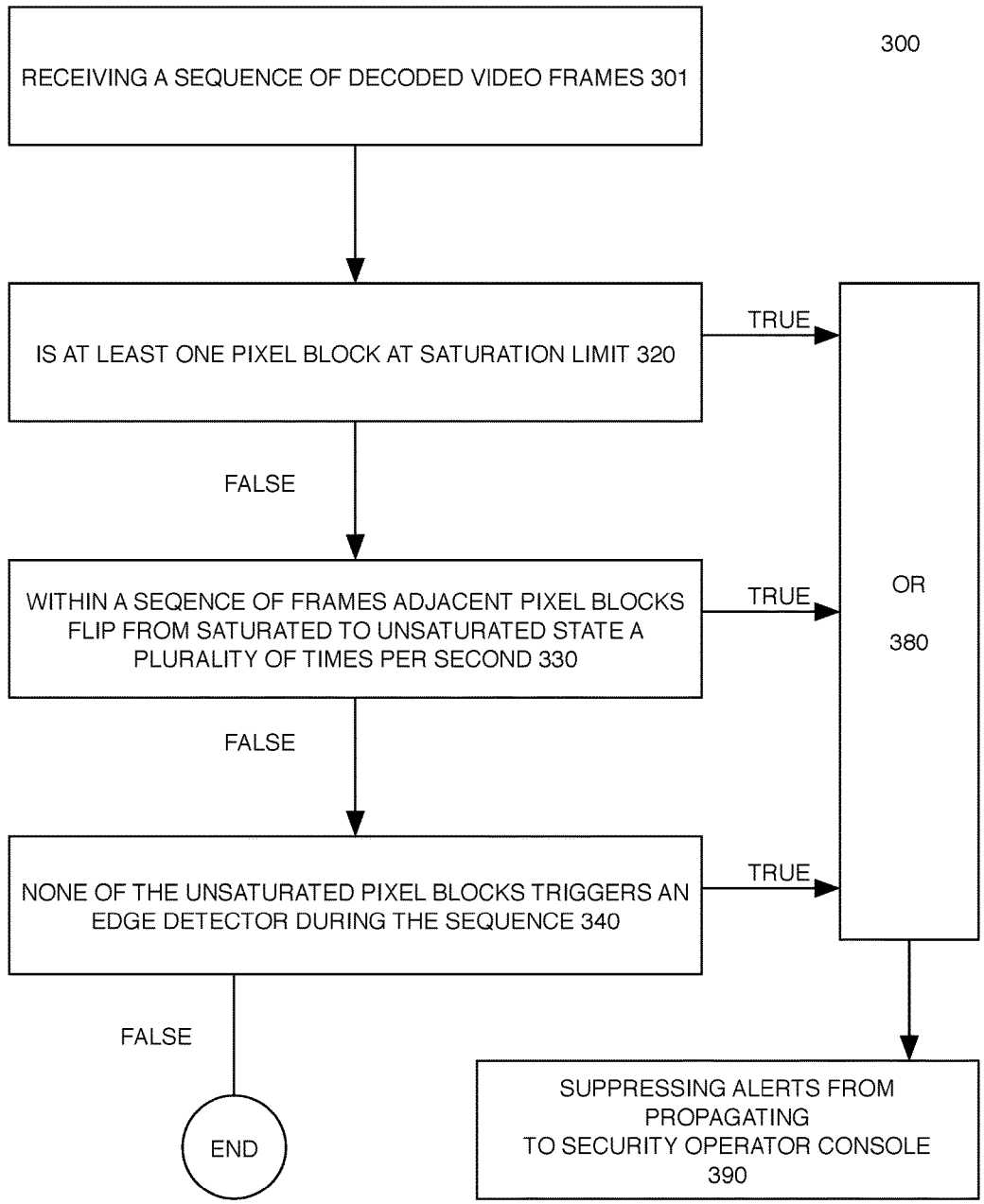
FIG. 3 is a flowchart of a method embodiment of one aspect of the invention for detecting insect indicia in a video stream.

Referring now to FIG. 3, a method 300 is disclosed in a flowchart of processes to identify insect indicia in a stream of video frames. The method for suppressing alerts to a security operator console includes: receiving a sequence of decoded video frames 301; determining that at least one pixel block is at a saturation limit 320; determining that within a sequence of frames adjacent pixel blocks switch from a saturated state to an unsaturated state a plurality of times per second 330; determining that none of the unsaturated pixel blocks triggers an edge detection circuit during the sequence 340; and, consequently, on the condition that at least one of the above determinations evaluates as true 380, suppressing alerts from propagation to a security operator console 390.

Figure 4:
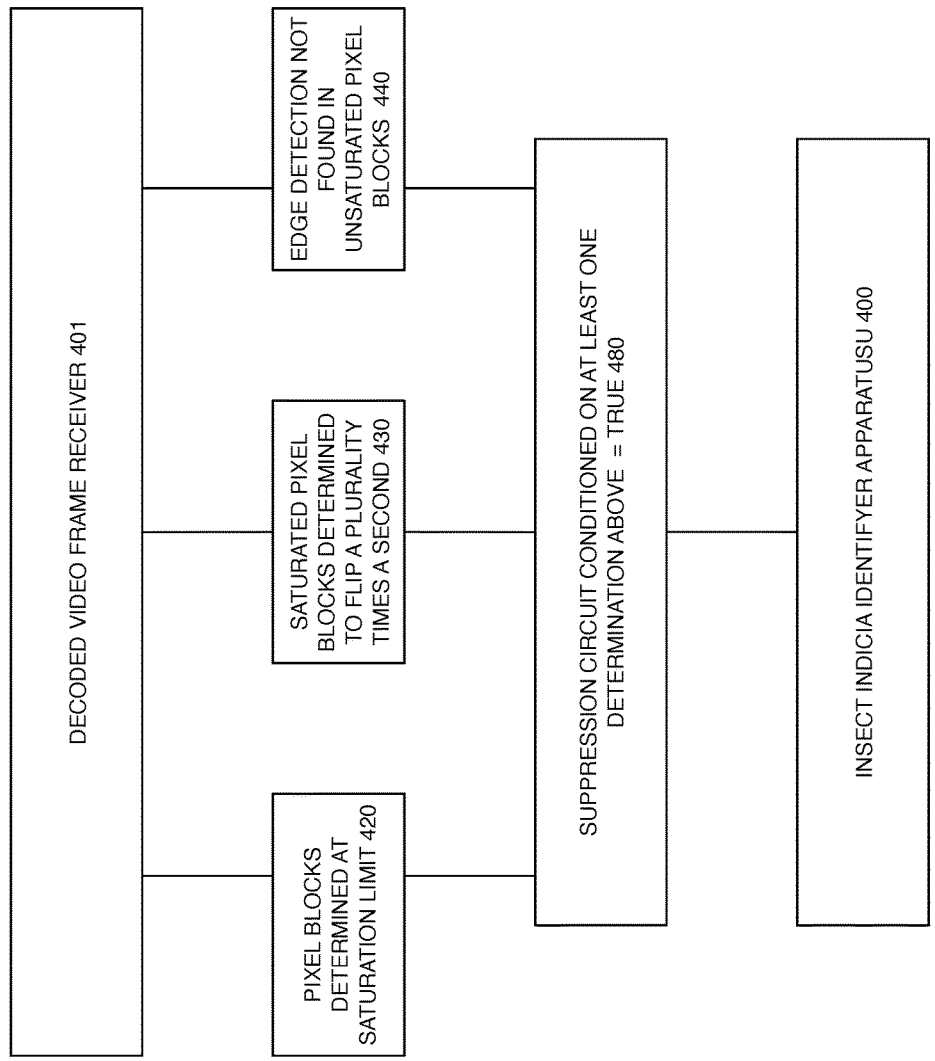
FIG. 4 is a block diagram of an apparatus embodiment of the invention.

Referring now to FIG. 4, an apparatus for identifying insect indicia in a video stream 400 includes, a circuit to receive at least one decoded video frame 401 which is coupled to the following; a circuit to determine a condition that at least one pixel block is at a saturation limit 420; a circuit to determine a condition that adjacent pixel blocks switch from a saturated state to an unsaturated state a plurality of times per second within a sequence of frames 430; a circuit to determine that none of the switching pixel blocks triggers on an edge detection 440; a logic circuit coupled to the above to detect that at least one of the conditions is determined to be true 480; and a circuit 490 coupled to the logic circuit 480 to transmit an alert suppression signal to a security alert apparatus.

CONCLUSION

The present invention reduces the annoyance of motion alerts to a security console operator when insects are attracted to infrared illumination of a surveillance camera.

FIG. 1 is a block diagram of at least one exemplary processor suitable for performing the steps of a method embodiment of the invention.

The techniques described herein can be implemented in digital electronic circuitry, or in computer hardware, firmware, software, or in combinations of them. The techniques can be implemented as a computer program product, i.e., a computer program tangibly embodied in a non-transitory information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; internal hard disks or removable disks. The processor and the memory can be supplemented by, or incorporated in special purpose logic circuitry.

FIG. 1 is a block diagram of an exemplary processor that may be used to perform one or more of the functions described herein. Referring to FIG. 1, processor 100 may comprise an exemplary client or server process. Processor 100 comprises a communication mechanism or bus 111 for communicating information, and a processor core 112 coupled with bus 111 for processing information. Processor core 112 comprises at least one processor core, but is not limited to a processor core, such as for example, ARM™, Pentium™, etc.

Processor 100 further comprises a random-access memory (RAM), or other dynamic storage device 104 (referred to as main memory) coupled to bus 111 for storing information and instructions to be executed by processor 112. Main memory 104 also may be used for storing temporary variables or other intermediate information during execution of instructions by processor core 112.

Processor 100 also comprises a read only memory (ROM) and/or other static storage device 106 coupled to bus 111 for storing static information and instructions for processor core 112, and a non-transitory data storage device 107, such as a magnetic storage device or flash memory and its associated control circuits. Data storage device 107 is coupled to bus 111 for storing information and instructions.

Processor 100 may further be coupled to a display device 121 such a flat panel display, coupled to bus 111 for displaying information to a computer user. Voice recognition, optical sensor, motion sensor, microphone, keyboard, touch screen input, and pointing devices 123 may be attached to bus 111 or a network interface (wired or wireless) 125 for communicating selections and command and data input to processor core 112.

It is understood that the processor may be embedded within other circuits of the system as an embodiment of an ARM core or equivalent or as a virtual machine within a multi-core server.

A number of embodiments of the invention have been described. Nevertheless, it will be understood that various modifications may be made without departing from the spirit and scope of the invention. For example, other network topologies may be used. Accordingly, other embodiments are within the scope of the following claims.

I claim:

1. A method of suppressing alerts to a security operator console comprising:
   receiving a sequence of video frames from a security camera;
   determining that at least one pixel block is at a saturation limit;
   determining that within a sequence of frames adjacent pixel blocks switch from a saturated state to an unsaturated state a plurality of times per second;
   determining that none of the switching pixel blocks triggers an edge detection circuit during the sequence; and,
   consequently, suppressing alerts from propagation to the security operator console.

* * * * *